(12) United States Patent
Sun et al.

(10) Patent No.: US 6,866,030 B1
(45) Date of Patent: Mar. 15, 2005

(54) MODEL BASED EXHAUST GAS RECIRCULATION CONTROL ALGORITHM

(75) Inventors: Min Sun, Windsor (CA); Marc Allain, Plymouth, MI (US); Laurentiu J. Vaduva, Harper Woods, MI (US)

(73) Assignee: Detroit Diesel Corporation, Detroit, MI (US)

( * ) Notice: Subject to any disclaimer, the term of this patent is extended or adjusted under 35 U.S.C. 154(b) by 0 days.

(21) Appl. No.: 10/765,238

(22) Filed: Jan. 26, 2004

(51) Int. Cl.[7] ............................................. F02M 25/07
(52) U.S. Cl. ............................ 123/568.21; 60/605.2
(58) Field of Search .................. 123/568.11, 568.21, 123/568.23, 568.24, 568.25, 567.26, 568.27, 568.28; 251/129.1, 129.12, 129.15, 129.16; 60/605.2

(56) References Cited

U.S. PATENT DOCUMENTS

| | | | |
|---|---|---|---|
| 6,305,167 B1 * | 10/2001 | Weisman et al. | 60/605.2 |
| 6,347,519 B1 | 2/2002 | Kreso | |
| 6,422,219 B1 * | 7/2002 | Savonen et al. | 123/568.21 |
| 6,502,563 B2 | 1/2003 | Itoyama | |
| 6,508,237 B2 * | 1/2003 | Romzek et al. | 123/568.21 |
| 6,553,949 B1 | 4/2003 | Kolmanovsky et al. | |
| 6,601,387 B2 | 8/2003 | Zurawski et al. | |
| 6,606,981 B2 | 8/2003 | Itoyama | |
| 2002/0173898 A1 | 11/2002 | Itoyama et al. | |
| 2003/0145836 A1 | 8/2003 | Linna et al. | |

FOREIGN PATENT DOCUMENTS

| | | | |
|---|---|---|---|
| JP | 08-128361 | 5/1996 | |
| JP | 2002332879 A * | 11/2002 | 60/605.2 |

* cited by examiner

Primary Examiner—Willis R. Wolfe, Jr.
(74) Attorney, Agent, or Firm—Brooks Kushman P.C.

(57) ABSTRACT

A method for controlling a compression ignition internal combustion engine exhaust gas recirculation (EGR) system having an EGR valve and actuator. The method includes continuously monitoring at least one engine parameter in real-time, and continuously adjusting an EGR valve position using a control signal in real-time in response to the at least one parameter and in response to at least one delay, wherein one of the at least one delays corresponds to an EGR actuator delay.

20 Claims, 3 Drawing Sheets

MODEL BASED EXHAUST GAS RECIRCULATION CONTROL ALGORITHM

BACKGROUND OF THE INVENTION

1. Field of the Invention

The present invention relates to a system and a method for controlling an exhaust gas recirculation (EGR) system.

2. Background Art

Internal combustion engines, and in particular, compression ignition (or diesel) engines have a wide variety of applications including passenger vehicles, marine vessels, earth-moving and construction equipment, stationary generators, and on-highway trucks, among others. Exhaust gas recirculation (EGR) systems have been introduced into internal combustion engines. EGR systems recirculate exhaust into the intake air stream of the engine, thereby reducing oxides of nitrogen that are formed when temperatures in the combustion chamber of the engine get too hot.

Although the EGR systems help to reduce exhaust emissions that cause smog, EGR systems cause the intake manifold air temperatures of the engine to increase to an undesirable level. Furthermore, the level of EGR is typically increased during vehicle deceleration (or decreased load conditions) and decreased during vehicle acceleration (or increased load conditions). When a diesel engine is operating in transient conditions (e.g., up and down bills, in response to a varying load, idle to rapid acceleration operation, intermittent workpiece characteristics for power takeoff driven applications, etc.), the EGR level should be varied to obtain an appropriate EGR level according to the operating conditions to maintain proper emissions reductions.

When the EGR valve is operated using an actuator, a delay occurs from when a command signal is input to the actuator to when the EGR valve starts operating. U.S. Pat. No. 6,502,563 to Itoyama discloses an EGR device which varies a target EGR amount using a routine that runs in synchronism with a crank angle sensor generated reference signal. However, the EGR control system disclosed by Itoyama can fail to properly compensate the EGR level during some operating conditions.

Thus, there exists a need and an opportunity for an improved system and an improved method for EGR control.

SUMMARY OF THE INVENTION

The present invention generally provides new, improved and innovative techniques for continuously controlling an exhaust gas recirculation (EGR) system. The improved system and method for EGR control of the present invention may minimize the effect of the delay in the EGR system actuator when compared to conventional approaches and, thus, may provide improved effectiveness and control for operation of the EGR system. Real-time EGR valve position may be integrated with EGR flow dynamics. A mathematical model based controller operation may continuously monitor EGR flow dynamics with respect to EGR valve discharge coefficient relationships in real-time.

According to the present invention, a method for controlling a compression ignition internal combustion engine exhaust gas recirculation (EGR) system having an EGR valve and actuator is provided. The method comprises continuously monitoring at least one engine parameter in real-time, and continuously adjusting an EGR valve position using a control signal in real-time in response to the at least one parameter and in response to at least one delay, wherein one of the at least one delays corresponds to an EGR actuator delay.

Also according to the present invention, a system for controlling a compression ignition internal combustion engine exhaust gas recirculation (EGR) system is provided. The system comprises an EGR valve having an actuator, at least one sensor, and an engine controller. The EGR valve actuator may be configured to continuously, adjust the EGR valve in real-time in response to a control signal. The at least one sensor may continuously monitor at least one engine component parameter and present in real-time a sensor signal that corresponds to at least one condition of the at least one engine component. The engine controller may be in communication with the EGR actuator and the at least one engine component parameter sensor. The engine controller may be configured to receive the sensor signal, and present the control signal. The control signal corresponds to at least one delay, and one of the at least one delays is an EGR actuator delay.

Further, according to the present invention, a controller for controlling a compression ignition internal combustion engine exhaust gas recirculation (EGR) system is provided. The controller comprises at least one output port that presents a control signal to an EGR valve having an actuator configured to adjust the EGR valve in real-time in response to the control signal, and at least one input port that receives a sensor signal from a respective sensor for continuously monitoring at least one engine component parameter and presenting in real-time the sensor signal that corresponds to at least one condition of the at least one engine component. The controller presents the control signal in response to at least one delay, and one of the at least one delays is an EGR actuator delay.

The above features, and other features and advantages of the present invention are readily apparent from the following detailed descriptions thereof when taken in connection with the accompanying drawings.

DETAILED DESCRIPTION OF THE PREFERRED EMBODIMENT(S)

With reference to the Figures, the preferred embodiments of the present invention will now be described in detail. Generally, the present invention provides an improved system and an improved method for controlling an engine exhaust gas recirculation (EGR) system.

The present invention is generally implemented in connection with an internal combustion engine (e.g., a compression ignition or diesel engine) having an EGR system. An EGR system generally introduces a metered portion of the engine exhaust gases into the intake manifold. The EGR system generally dilutes the incoming air and fuel charge with the exhaust gases and lowers combustion temperatures to reduce the level of oxides of nitrogen. Since EGR systems recirculate exhaust gas into the intake air stream of the engine via an EGR valve and actuator device, there is generally a delay between a signal that controls the EGR valve and the response of the EGR valve and actuator and the engine flow dynamics (i.e., the flow dynamics of the intake and exhaust gases).

To control or optimize at least one mode of the engine (e.g., an internal combustion engine in general and a compression ignition engine in particular) operation and EGR operation where the respective operations are generally controlled by an electronic control module (ECM)/ powertrain control module (PCM) or controller, the engine controller should be adaptable (i.e., programmable, modifiable, configurable, etc.) to a variety of input signals or parameters, for all operating conditions, continuously, and in real-time. However, conventional electronic engine controllers have a limited set of parameters that are used (i.e., monitored) by the controller to adjust (i.e., control, modify, determine, select, etc.) the engine operation and the EGR operation, and the control is typically not performed continuously and not performed in real-time. Furthermore, conventional approaches to control of EGR operation are typically limited to varying an EGR amount according to the opening of an EGR valve in response to a crank angle sensor signal (i.e., intermittently, not continuously, and not in real-time).

Figure 1:
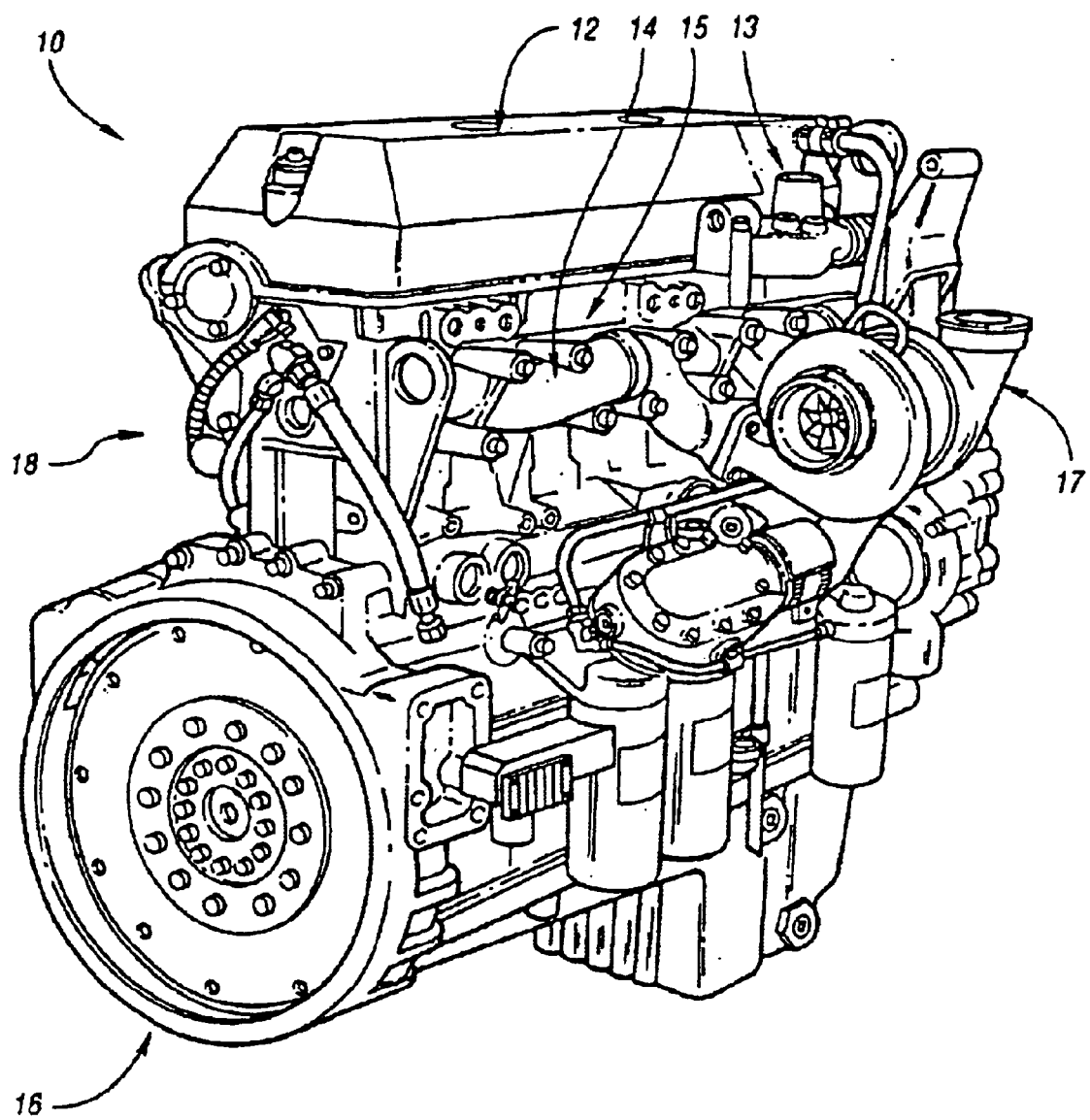
FIG. 1 is a diagram illustrating a compression ignition engine incorporating various features of the present invention.

Referring to FIG. 1, a perspective view illustrating a compression-ignition internal combustion engine 10 incorporating various features according to the present invention is shown. The engine 10 may be implemented in a wide variety of applications including on-highway trucks, construction equipment, marine vessels, stationary generators, pumping stations, and the like. The engine 10 generally includes a plurality of cylinders disposed below a corresponding cover, indicated generally by reference numeral 12.

In a preferred embodiment, the engine 10 is a multi-cylinder compression ignition internal combustion engine, such as a 3, 4, 6, 8, 12, 16, or 24 cylinder diesel engine. However, the engine 10 may be implemented having any appropriate number of cylinders 12, the cylinders having any appropriate displacement and compression ratio to meet the design criteria of a particular application. Moreover, the present invention is not limited to a particular type of engine or fuel. The present invention may be implemented in connection with any appropriate engine (e.g., Otto cycle, Rankine cycle, Miller cycle, etc.) using an appropriate fuel to meet the design criteria of a particular application.

An EGR valve 13 is generally connected between an exhaust manifold 14 and an intake manifold 15. The EGR valve 13 generally provides recirculation of a portion of exhaust gas in response to at least one predetermined engine 10 operating condition (e.g., a time in EGR, a load presented to the engine, etc.). The EGR valve 13 is generally implemented as a variable flow device. The EGR valve 13 generally includes an actuator that opens and closes the EGR valve an amount (i.e., level, to a position, etc.) that corresponds to (i.e., in response to) a control signal, and a sensor that generates a position signal that corresponds to (i.e., in response to) the amount of opening of the EGR valve. A turbocharger 17 may be installed in the engine 10 exhaust stream and may provide pressurized air to the intake manifold 15. The turbocharger 17 may be implemented as a variable geometry device (VGT) or a fixed geometry device.

The engine 10 generally includes an engine control module (ECM), powertrain control module (PCM), or other appropriate controller 32 (shown and described in detail in connection with FIG. 2). The ECM 32 generally communicates with various engine sensors and actuators via associated interconnection cabling (i.e., leads, wires, connectors, etc.) 18, to control the engine 10 and at least the EGR valve 13. In addition, the ECM 32 generally communicates with an engine operator or user (not shown) using associated lights, switches, displays, and the like (not shown).

In one example, the engine 10 may be mounted (i.e., installed, implemented, positioned, disposed, etc.) in a vehicle (not shown). In another example, the engine 10 may be installed in a stationary environment. The engine 10 may be coupled to a transmission (not shown) via flywheel 16. Many transmissions include a power take-off (PTO) configuration where an auxiliary shaft (not shown) may be connected to associated auxiliary equipment (not shown).

The auxiliary equipment may be driven by the engine 10/transmission at a relatively constant rotational speed using an engine variable speed governor (VSG) feature. The auxiliary equipment may include hydraulic pumps for construction equipment, water pumps for fire engines, power generators, and any of a number of other rotationally driven accessories. Typically, when the PTO apparatus is installed on a vehicle, the PTO mode is generally used while the vehicle is stationary. However, the present invention is independent of the particular operation mode of the engine 10, or whether the vehicle is stationary or moving for the applications in which the engine 10 is used in a vehicle having a PTO mode. The loads presented to the engine 10/transmission in a stationary configuration may be relatively constant or may vary.

Figure 2:
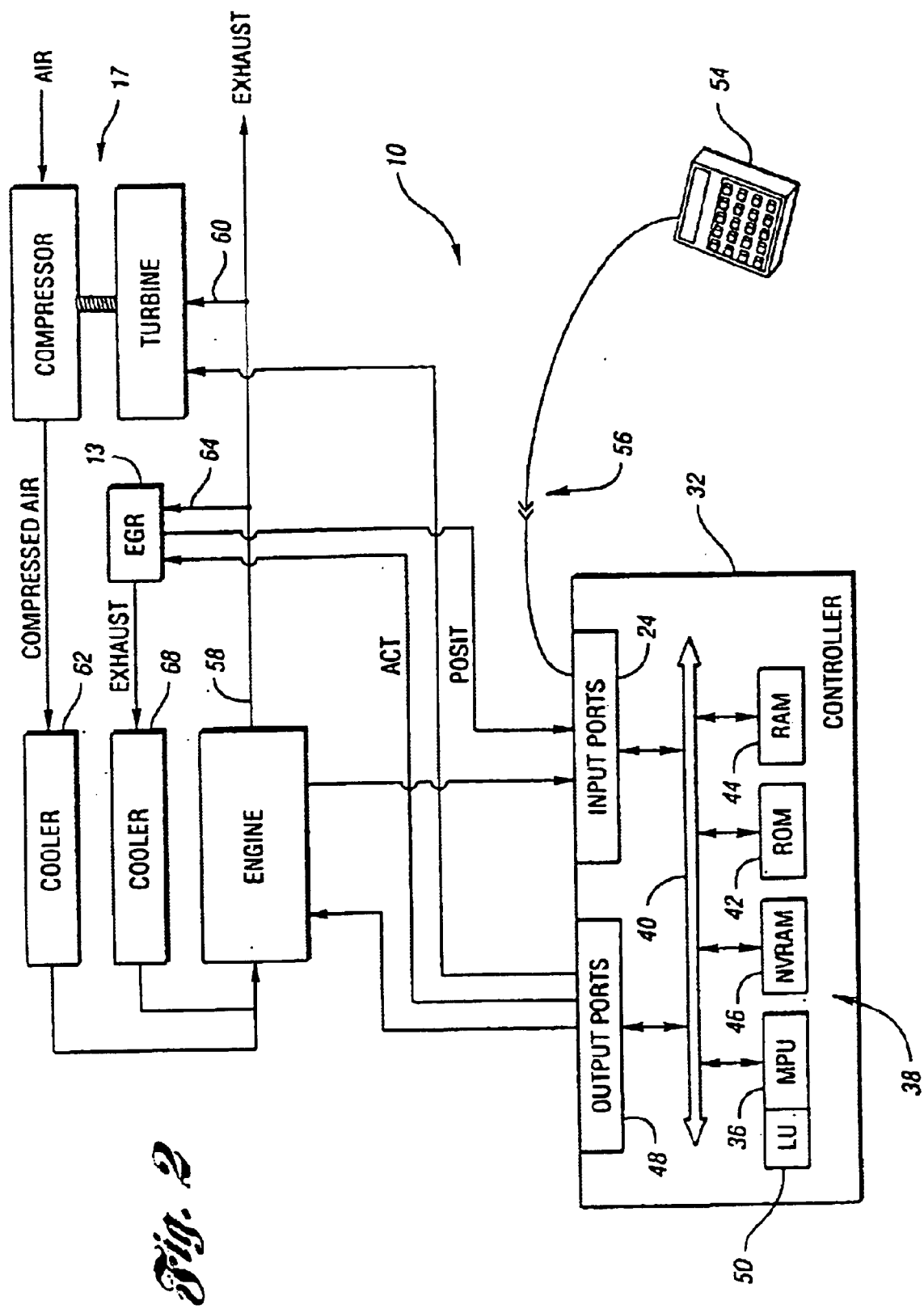
FIG. 2 is a schematic diagram of an internal combustion engine and engine control system of the present invention.

Referring to FIG. 2, the internal combustion engine 10 and associated control system (or controller) 32 and subsystems are shown. Various sensors and switches (not shown) are generally in electrical communication with (i.e., are connected or coupled to) the controller 32 via input ports 24. The sensors may include various position sensors such as an accelerator or brake position sensor. Likewise, the sensors may include a coolant temperature sensor that generally provides an indication of the temperature of an engine block and an intake manifold air temperature sensor that generally provides an indication of the temperature of the engine intake air at the inlet or within the intake manifold 15.

Likewise, an oil pressure sensor may be used to monitor the engine 10 operating conditions by providing an appropriate signal to the controller 32. Other sensors may include at least one sensor that indicates actuation (e.g., percentage of open) of the EGR control valve 13, at least one sensor that indicates actuation of at least one cooling fan, and at least one sensor that indicates rotational speed of the at least one cooling fan.

Other sensors may include rotational sensors to detect the rotational speed of the engine 10, such as an RPM sensor and a vehicle speed sensor (VSS) in some applications. The VSS generally provides an indication of the rotational speed of the output shaft or tailshaft (not shown) of the transmission. The speed of the shaft monitored via the VSS may be used to calculate the vehicle speed. The VSS may also represent one or more wheel speed sensors which may be used in anti-lock breaking system (ABS) applications, vehicle stability control systems, and the like.

The controller 32 preferably comprises a programmable microprocessor 36 in communication with (i.e., coupled to) various computer readable storage media 38 via at least one data and control bus 40. The computer readable storage media 38 may include any of a number of devices such as read only memory (ROM) 42, random access memory (RAM) 44, and non-volatile (keep-alive) random access memory (NVRAM) 46.

The various types of computer-readable storage media 38 generally provide short-term and long-term storage of data (e.g., at least one lookup table, LUT, at least one operation control routine, at least one mathematical model for EGR control, etc.) used by the controller 32 to control the engine 10 and the EGR valve 13. The computer-readable storage media 38 may be implemented by any of a number of known physical devices capable of storing data representing instructions executable by the microprocessor 36. Such devices may include PROM, EPROM, EEPROM, flash memory, and the like in addition to various magnetic, optical, and combination media capable of temporary and permanent data storage.

The computer-readable storage media 38 may include data representing program instructions (e.g., software), calibrations, routines, steps, methods, blocks, operations, operating variables, and the like used in connection with associated hardware to control the various systems and subsystems of the engine 10, the EGR valve 13, and the vehicle. The engine/vehicle/EGR system control logic is generally implemented via the controller 32 based on the data stored in the computer-readable storage media 38 in addition to various other electric and electronic circuits (i.e., hardware, firmware, etc.).

The computer readable storage media 38 generally have instructions stored thereon that may be executable by the controller 32 to control the internal combustion engine 10, including the EGR valve 13 and a variable geometry device (when so equipped) on the turbocharger 17. The program instructions may direct the controller 32 to control the various systems and subsystems of the vehicle where the engine 10 is implemented, with the instructions being executed by microprocessor 36, and optionally, instructions may also be executed by any number of logic units 50. The input ports 24 may receive signals from the various sensors and switches, and the controller 32 may generate signals at output ports 48. The output signals are generally presented (or transmitted) to the various vehicle components (e.g., the EGR valve 13 actuator, other actuators, indicators, and the like).

The actuators may include various engine components which are operated via associated control signals from the controller 32. The various actuators may also provide signal feedback to the controller 32 relative to the actuator operational state (e.g., via a respective sensor), in addition to feedback position or other signals used control to the actuators. The actuators preferably include a plurality of fuel injectors which are controlled via associated (or respective) solenoids to deliver fuel to the corresponding cylinders 12. The actuators may include at least one actuator that may be implemented to control the EGR valve 13.

A data, diagnostics, and programming interface 54 may also be selectively connected to the controller 32 via a bus and connector 56 to exchange various information therebetween. The interface 54 may be used to change values within the computer readable storage media 38, such as configuration settings, calibration variables, instructions for EGR and engine control, at least one constant that corresponds to the EGR valve 13 geometry, and the like.

As used throughout the description of the present invention, at least one selectable (i.e., programmable, predetermined, modifiable, etc.) constant, limit (i.e., threshold, level, interval, value, amount, duration, etc.) or range of values may be selected by any of a number of individuals (i.e., users, operators, owners, drivers, etc.) via a programming device, such as the device 54 selectively connected via an appropriate plug or connector 56 to the controller 32. Rather than being primarily controlled by software, the selectable or programmable constant and limit (or range) values may also be provided by an appropriate hardware circuit having various switches, dials, and the like. Alternatively, the selectable or programmable limit and range may also be changed using a combination of software and hardware without departing from the spirit of the present invention. However, the at least one selectable value or range may be predetermined and/or modified by any appropriate apparatus and method to meet the design criteria of a particular application. Any appropriate number and type of sensors, indicators, actuators, etc. may be implemented to meet the design criteria of a particular application.

In at least one mode of operation, the controller 32 may receive signals from the various vehicle sensors and switches, and execute control logic embedded in hardware and software to control the engine 10, the EGR valve 13, or both the engine 10 and the EGR valve 13. In a preferred embodiment, the controller 32 is implemented as at least one implementation of a DDEC controller available from Detroit Diesel Corporation, Detroit, Mich. Various other features of the DDEC controller are described in detail in a number of different U.S. patents assigned to Detroit Diesel Corporation. However, the present invention may be implemented in connection with any appropriate controller to meet the design criteria of a particular application.

Control logic may be implemented in hardware, firmware, software, or combinations thereof. Further, control logic may be executed by the controller 32, in addition to and by any of the various systems and subsystems of the vehicle or other installation where the controller 32 is implemented. Yet further, although in a preferred embodiment, the controller 32 includes the microprocessor 36, any of a number of known programming and processing techniques or strategies may be implemented to control the engine 10, the EGR valve 13, or both the engine 10 and the EGR valve 13 in accordance with the present invention. Further, the engine controller 32 may receive information in a variety of ways. For example, engine 10 systems information may be received over a data link, at a digital input, or at a sensor input of the engine controller 32.

The controller 32 generally provides enhanced engine performance by controlling the variable flow EGR valve 13. The amount of exhaust gas to be recirculated is generally controlled by the EGR valve 13. In accordance with the present invention, the EGR valve 13 comprises a variable flow valve that is electronically controlled by the controller 32. There may be many possible configurations for a controllable EGR valve, and embodiments of the present invention are not limited to any particular structure for the EGR valve 13. Further, various sensors located at the EGR valve 13, on the engine 10, and in connection with corresponding systems, subsystems, and components may detect temperature and differential pressure to provide for determination of the exhaust gas mass flow rate through the EGR valve 13 via the controller 32.

In addition, various sensor configurations may be implemented in various parts of the exhaust flow paths of the engine 10 to provide the controller 32 with appropriate signals to determine the various respective mass flow rates throughout the exhaust system (e.g., exhaust gas flow 58 from the exhaust manifold 14), including flow through the EGR system (e.g., flow 64) and flow through the turbocharger 17 compressor (e.g., flow 60), and any other flows to meet the design criteria of a particular application. In particular, sensors are generally implemented to provide signals to respective input ports 24 that correspond to (or relate to) EGR 13 valve and actuator position, intake manifold 15 air pressure, exhaust manifold 14 exhaust gas pressure, turbocharger 17 compressor inlet air temperature, and turbocharger 17 compressor inlet air pressure.

In at least one example, a cooler 62 may be implemented to cool the charge (i.e., compressed) air coming from the turbocharger 17. Similarly, in at least one example, a cooler 68 may be implemented to cool the exhaust gas flow from the EGR valve 13 to the intake manifold 15 through the EGR system prior to reintroduction to engine 10.

Embodiments of the present invention include control logic that processes various input signals representing various engine (or component, system, subsystem, etc.) conditions, and in turn, provides at least one EGR command (or control) signal (e.g., ACT). The EGR command (or control) signal ACT generally controls a position of the variable flow EGR valve 13 to control gas flow through the EGR exhaust gas flow path 64. The EGR position sensor generally presents a signal (e.g., POSIT) to at least one of the input ports 24. The position signal POSIT generally corresponds to (i.e., is related to) the position (e.g., percentage of opening or closing) of the EGR valve 13.

In one embodiment, the controller 32 controls various components such as a fuel pump to transfer fuel from a source to a common fuel rail or manifold. However, in another example, the present invention may be implemented in connection with a direct injection engine. Operation of solenoids generally controls delivery of the timing and duration of fuel injection (i.e., an amount, timing and duration of fuel). While the representative engine and control system 10 illustrates an example application environment of the present invention, as noted previously the present invention is not limited to any particular type of fuel or fueling system and thus may be implemented in any appropriate engine and/or engine system to meet the design criteria of a particular application.

The sensors, switches and actuators may be implemented to communicate status and control information to the engine operator via a console (not shown). The console may include various switches in addition to indicators. The console is preferably positioned in close proximity to the engine operator, such as in a cab (i.e., passenger compartment, cabin, etc.) of the vehicle (or environment) where the system 10 is implemented. The indicators may include any of a number of audio and visual indicators such as lights, displays, buzzers, alarms, and the like. Preferably, one or more switches may be used to request at least one particular operating mode, such as climate control (e.g., air conditioning), cruise control or PTO mode, for example.

In one example, the controller 32 includes control logic to control at least one mode of operation of the engine 10 and at least one mode of operation of the EGR 13 valve and actuator system. In another example, the controller 32 may be implemented as an EGR controller and engine control may be performed via another controller (not shown). Modes of engine 10 operation that may be controlled include engine idle, PTO operation, engine shutdown, maximum permitted vehicle speed, maximum permitted engine speed (i.e., maximum engine RPM), whether the engine 10 may be started (i.e., engine start enable/disable), engine operation parameters that affect engine emissions (e.g., timing, amount and duration of fuel injection, EGR control, exhaust air pump operation, etc.), cruise control enable/disable, seasonal shutdowns, calibration modifications, and the like.

The signal POSIT generally provides a real-time EGR valve 13 position indication that may be integrated (e.g., combined, processed, etc.) with EGR flow dynamics. The controller 32 (e.g., the microprocessor 46 and the memory 38) may be programmed with at least one mathematical model that may continuously capture (i.e., monitor) EGR flow dynamics (via a number of input signals presented by sensors to the respective input ports 24) with respect to EGR valve 13 discharge coefficient relationships in real-time and continuously generate the real-time EGR valve 13 control signal ACT to continuously adjust (i.e., set, modify, control, select, etc.) the EGR valve 13 position (or opening) in real-time according to the following relationships.

In general, $$\Delta W = Wd - Wa$$

where, $\Delta W$, is a desired change for the EGR exhaust gas mass flow rate;

Wd, is a desired EGR exhaust gas mass flow rate; and

Wa, is the actual EGR exhaust gas mass flow rate.

Further, $$Wa = (\sqrt{((\Delta P * TPI)/(C * TTI))}) * dis\_c$$

or $$dis\_c = Wa / (\sqrt{((\Delta P * TPI)/(C * TTI))})$$

and $$\Delta dis\_c = (\Delta W * dis\_c) / Wa$$

where,

Wa, is a continuous determined (e.g., calculated) EGR real-time measured mass flow rate;

dis_c, is EGR valve delayed discharge coefficient for a given (or particular) EGR valve 13 at a particular EGR opening (i.e., dis_c is a factor that is related to the ratio of the area of the EGR valve 13 outlet at a particular EGR valve opening to the area of the EGR valve 13 inlet area, and dis_c corresponds to the position signal POSIT and at least one delay such as the EGR actuator delay);

$\Delta dis\_c$, is a desired change for the EGR valve discharge coefficient dis_c;

C, is an EGR valve mathematical model predetermined constant for a given EGR valve 13;

$\Delta P$, is a continuously measured real-time pressure differential across the engine (i.e., exhaust manifold 14 gas pressure minus intake manifold 15 air pressure);

TPI, is a continuously measured real-time turbocharger 17 compressor inlet pressure; and TTI, is a continuously measured real-time turbocharger 17 compressor inlet temperature.

The controller 32 generally determines the control signal ACT according to the equation:

$$\Delta dis\_c + dis\_c \rightarrow ACT$$

That is, a desired change for EGR valve discharge coefficient plus the EGR valve discharge coefficient continuously generates an EGR actuator position control signal (e.g., the signal ACT). The value (i.e., amount, level, etc.) that is determined (i.e., calculated, set, etc.) for the signal ACT generally integrates (e.g., combines, processes, etc.)

the EGR valve 13 position feedback, EGR valve actuator delay, intake air and exhaust gas flow dynamics (e.g., delays) in connection with EGR valve discharge coefficient relationships as determined in response to the EGR valve 13 position (i.e., the signal POSIT).

In the present invention, at least one delay (e.g., EGR valve actuator delay, intake air and exhaust gas flow dynamics delays, etc.) is generally implemented to produce more optimized EGR mass flow convergence criteria (i.e., more effective EGR system control). The EGR mass flow rate (e.g., Wa) that is continuously determined in real-time generally corresponds to at least the EGR valve 13 actuator delay. In the present invention, the delayed discharge coefficient (i.e., dis_c) may be determined in response to the signal POSIT and implemented to determine the desired change for the EGR valve 13 discharge coefficient (i.e., $\Delta$dis_c). The delayed discharge coefficient dis_c may correspond to the continuously determined real-time EGR valve 13 mass flow rate Wa.

Figure 3:
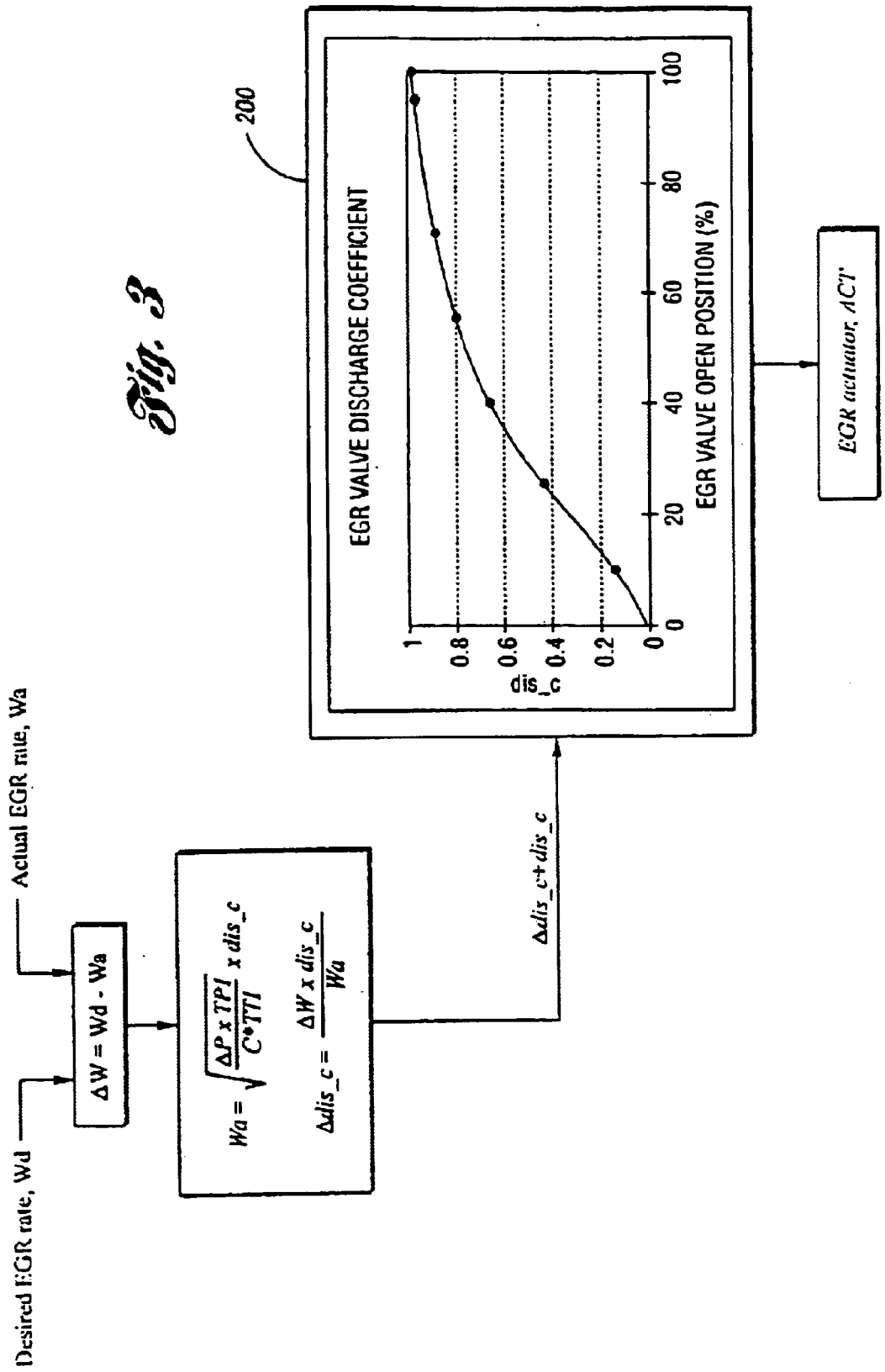
FIG. 3 is a diagram of an example discharge coefficient relationship.

Referring to FIG. 3, a diagram of an example discharge coefficient (i.e., dis_c) 200 is shown. The plot 200 illustrates an example of the discharge coefficient dis_c for a particular EGR valve 13 at a particular engine 10 operating condition for EGR valve 13 opening in the range of 0% to 100%.

As is readily apparent from the foregoing description, then, the present invention generally provides an improved apparatus and an improved method for controlling an engine EGR valve. The improved system and method for EGR control of the present invention may minimize the effect of the delay in the EGR system actuator when compared to conventional approaches and, thus, may provide improved effectiveness and control for operation of the EGR system. Real-time EGR valve position may be integrated with EGR flow dynamics. A mathematical model based controller operation may continuously monitor EGR flow dynamics with respect to EGR valve discharge coefficient relationships in real-time.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for controlling a compression ignition internal combustion engine exhaust gas recirculation (EGR) system having an EGR valve and actuator, the method comprising:

continuously monitoring at least one engine parameter in real-time; and continuously adjusting an EGR valve position using a control signal in real-time in response to the at least one parameter and in response to at least one delay, wherein one of the at least one delays corresponds to an EGR actuator delay.

2. The method of claim 1 further comprising determining the control signal via a mathematical model programmed in a controller that comprises a microprocessor and media.

3. The method of claim 1 further comprising determining the control signal in response to a position signal that corresponds to a position or percentage of opening or closing of the EGR valve.

4. The method of claim 1 wherein a desired change for EGR exhaust gas mass flow rate substantially equals a desired EGR exhaust gas mass flow rate minus actual EGR exhaust gas mass flow rate.

5. The method of claim 1 wherein the control signal corresponds to an EGR valve delayed discharge coefficient plus a desired change for the EGR valve discharge coefficient, and the EGR valve delayed discharge coefficient is related to the ratio of the area of the EGR valve outlet at a particular EGR valve opening to the area of the EGR valve inlet area.

6. The method of claim 1 further comprising determining the control signal in response to an intake manifold air pressure.

7. The method of claim 1 further comprising determining the control signal in response to an exhaust manifold exhaust gas pressure.

8. The method of claim 1 further comprising determining the control signal in response to a turbocharger compressor inlet air temperature.

9. The method of claim 1 further comprising determining the control signal in response to a turbocharger compressor inlet air pressure.

10. A system for controlling a compression ignition internal combustion engine exhaust gas recirculation (EGR) system, the system comprising:

an EGR valve having an actuator configured to continuously adjust the EGR valve in real-time in response to a control signal;

at least one sensor for continuously monitoring at least one engine component parameter and presenting in real-time a sensor signal that corresponds to at least one condition of the at least one engine component; and an engine controller in communication with the EGR actuator and the at least one engine component parameter sensor, the engine controller configured to receive the sensor signal, and present the control signal, wherein the control signal corresponds to at least one delay, and one of the at least one delays is an EGR actuator delay.

11. The system of claim 10 wherein the controller further comprises a microprocessor and media that are programmed with a mathematical model to determine the control signal.

12. The system of claim 10 wherein the at least one engine condition is at least one of an intake manifold air pressure, an exhaust manifold exhaust gas pressure, a turbocharger compressor inlet air temperature, and a turbocharger compressor inlet air pressure.

13. The system of claim 10 wherein a desired change for EGR exhaust gas mass flow rate substantially equals a desired EGR exhaust gas mass flow rate minus actual EGR exhaust gas mass flow rate.

14. The system of claim 10 wherein the control signal corresponds to an EGR valve delayed discharge coefficient plus a desired change for the EGR valve discharge coefficient, and the EGR valve delayed discharge coefficient is related to the ratio of the area of the EGR valve outlet at a particular EGR valve opening to the area of the EGR valve inlet area.

15. The system of claim 10 wherein the control signal is determined in response to a position signal that corresponds to a position or percentage of opening or closing of the EGR valve.

16. A controller for controlling a compression ignition internal combustion engine exhaust gas recirculation (EGR) system, the controller comprising:

at least one output port that presents a control signal to an EGR valve having an actuator configured to adjust the EGR valve in real-time in response to the control signal; and at least one input port that receives a sensor signal from a respective sensor for continuously monitoring at least one engine component parameter and presenting in real-time the sensor signal that corresponds to at least one condition of the at least one engine component, wherein the controller presents the control signal in response to at least one delay, and one of the at least one delays is an EGR actuator delay.

17. The controller of claim 16 wherein the controller further comprises a microprocessor and media that are programmed with a mathematical model to determine the control signal.

18. The controller of claim 16 wherein the control signal is determined in response to a position signal that corresponds to a position or percentage of opening or closing of the EGR valve.

19. The controller of claim 16 wherein a desired change for EGR exhaust gas mass flow rate substantially equals a desired EGR exhaust gas mass flow rate minus actual EGR exhaust gas mass flow rate.

20. The controller of claim 16 wherein the control signal corresponds to an EGR valve delayed discharge coefficient plus a desired change for the EGR valve discharge coefficient, and the EGR valve delayed discharge coefficient is related to the ratio of the area of the EGR valve outlet at a particular EGR valve opening to the area of the EGR valve inlet area.

* * * * *